Sept. 9, 1969     J. T. SCHUPLIN     3,465,992

FASTENING DEVICE

Filed June 27, 1967

INVENTOR.
JEROME T. SCHUPLIN
BY
Teare, Teare & Sammon
ATTORNEYS

United States Patent Office
3,465,992
Patented Sept. 9, 1969

3,465,992
FASTENING DEVICE
Jerome T. Schuplin, Parma Heights, Ohio, assignor to Tinnerman Products, Inc., a corporation of Ohio
Filed June 27, 1967, Ser. No. 649,258
Int. Cl. F16b 2/02
U.S. Cl. 248—71            10 Claims

ABSTRACT OF THE DISCLOSURE

A fastening device made from polymeric material including a flexible, variable length strap member, a deformable loop-like body member attached to and extending from one side of the strap member and a drive pin member attached to and extending from the opposite side of the strap member and adapted to be inserted into the loop-like body member for deforming the same into locking engagement with a support member.

Background of the invention

The present invention relates to fastening devices, and more particularly relates to a fastening device made from polymeric material for use in mounting articles, such as wire bundles, tubing, rod, cable or the like, on an apertured support member; or for use as harness ties or wire ties when not employed with a panel.

Heretofore, there has been a need for a simple, yet efficient fastening device for mounting the aforementioned types of articles or other such articles of varying shape, particularly in inaccessible or blind locations where installation of the device can be made from only one side thereof. Such devices should be inexpensive to produce and quick and easy to install, such as from the front side of a panel or the like, with a minimum of time and effort and without the use of special auxiliary equipment and/or tools. The device should be rust-proof, non-conductive, non-abrasive and vibration-proof for a wide variety of applications.

A fastening device which may be employed for a somewhat similar application is disclosed in the United States patent to A. J. Bennett 3,273,839.

Summary of the invention

The present invention relates to a fastening device made from polymeric material adapted for mounting an article on a support member comprising a flexible strap member, a deformable loop-like body member attached to and extending from one side of said strap member, a drive pin member attached to and extending from the opposite side of said strap member and adapted to be inserted into said loop-like body member for deforming the same into interlocking coacting engagement with said support member. The loop-like body member includes interior cam-like projections which are adapted for caming coacting engagement with an enlarged bulbous portion on said drive pin member for spreading deformation of said loop-like body member upon insertion of said bulbous portion passed said projections. Said drive pin member further including abutment portions coacting with said loop-like body member and operating with said cam-like projections for holding said drive pin member in a pre-latched position within said loop-like body member. The drive pin member further including shoulder portions adapted for underlying coacting engagement with said cam-like projections for preventing withdrawal of said drive pin member from said loop-like body member in the final latched position of said device.

Description of the preferred embodiments

Figure 1:
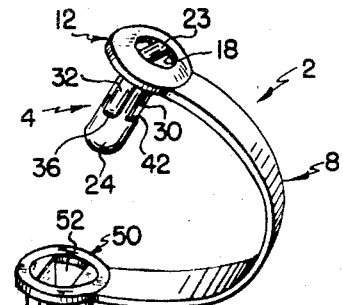
FIG. 1 is a generally perspective view of the fastening device made in accordance with the invention.

Referring now again to the drawings and in particular to FIG. 1 thereof, there is illustrated the fastening device, designated generally at 2, which is shown as comprising a male drive pin or expander member 4 and a female socket and locking member 6 which are made integral with and which extend alternately from opposed ends of a variable length, flexible strap member 8. As shown, the device is preferably of a unitary, one-piece construction made from a polymeric material, such as polypropylene, nylon or the like.

Figure 2:
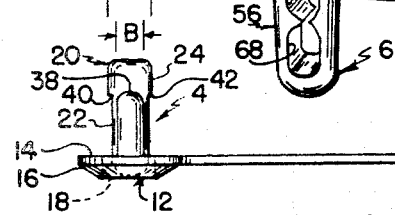
FIG. 2 is a side elevation view of the fastening device of the invention.

As best seen in FIG. 2, the expander member 4 extends generally vertically upwardly from one side of the strap member 8 while the socket member 6 extends generally vertically downwardly from the opposite side of the strap member 8. By this arrangement, the socket member 6 may be inserted through an aperture 10 in a support member P, such as a panel or the like, so that the strap member 8 may be turned up and wrapped in loop-like relationship about an article W, such as a bundle of electrical conductors or the like, and then inserted into the socket member 6 for holding the article in assembled relationship on the support member P. In the embodiment shown, the aperture 10 in the support member P is preferably circular in shape.

Figure 3:
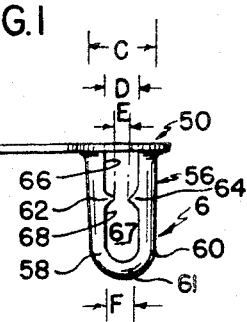
FIG. 3 is an end view of the drive pin member removed from the assembly of FIG. 2 and looking from the left-hand side of FIG. 2.
Figure 3:
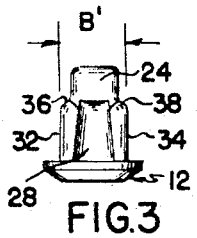
Figure 4:
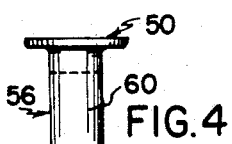
FIG. 4 is an end view of the loop-like body member removed from the assembly of FIG. 2 and looking from the right-hand side of FIG. 2.
Figure 5:
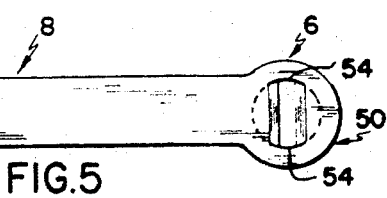
FIG. 5 is a top view of the fastening device shown in FIG. 2.

As best seen in FIGS. 2, 3 and 5, the expander member 4 comprises a head 12 which may have a generally circular shape, in top plan. The head 12 includes a generally flat under surface 14 which is disposed to lie in the general plane of the strap member 8 and a generally conical upper surface 16 which projects beyond the general plane of the strap member 8. As shown, the head 12 includes a centrally disposed opening 18 which extends therethrough and which is preferably circular in shape. An elongated body 20 is made integral with and extends generally vertically outwardly from the head 12. The body 20 is preferably of a solid construction, including an upper shank portion 22 and a lower bulbous portion 24. It is to be understood, however, that the body 20 could be made of a hollow and/or a partly hollow construction as desired.

The upper end of the shank portion 22 is made integral with the head 12 and is disposed in transverse bridging relationship, as at 23, in the head opening 18 so as to define generally arcuate slots 25 and 26 (FIG. 5) on either side thereof. The shank portion 22 is preferably of a polygonal, such as rectangular, shape in transverse cross-section and includes a pair of oppositely disposed, generally flat side surfaces 28 and 30 and a pair of oppositely disposed, generally rounded axial end edges 32 and 34 which end edges terminate in rounded abutment portions 36 and 38. As best seen in FIG. 3, the side surfaces 28 and 30 taper convergently in a direction away from the head 12 and between the rounded end edges 32 and 34 of the shank portion 22.

The bulbous portion 24 is made integral with the shank portion 22 of the body 20. Preferably, the bulbous portion 24 is of a generally circular shape in transverse cross-section and has a minimum transverse dimension A (diameter) which is greater than the maximum transverse width B of the shank portion 22, as seen in FIG. 2. By this arrangement, the bulbous portion 24 defines a pair of oppositely disposed arcuate shoulder portions 40 and 42 at the juncture thereof with the shank portion 22, as best seen in FIGS. 1 and 2. As shown, the rounded abutment portions 36 and 38 and the shoulder portions are generally disposed so as to lie in a common plane at the juncture between the shank 22 and bulbous 24 portions, as seen in FIG. 2. Preferably, the shank portion 22 has a transverse length B′ which is greater than the maximum transverse dimension A (diameter) of the bulbous portion 24.

Figure 6:
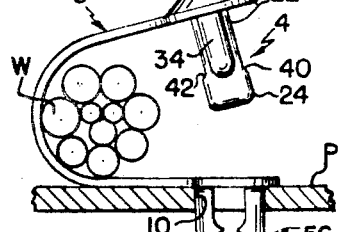
FIG. 6 is a fragmentary view, partly in section showing an initial step for mounting an article, such as a wire bundle or the like, on a support member.

The female socket and locking member 6, in the embodiment shown, comprises a generally flat head 50 which preferably has a generally circular shape, in top plane, and which head is disposed so as to lie in the general plane of the flexible strap member 8. The head 50 is provided with an opening 52 (FIG. 1) for receiving the expander member 4 therethrough. As shown, the opening 52 is preferably of a polygonal, such as rectangular, shape with arcuate portions, as 54 (FIG. 5), at the opposed ends thereof. An elongated, generally U-shaped body 56 extends generally vertically outwardly from the head 50. As shown, the body 56 includes a pair of oppositely disposed, resilient legs 58 and 60 which are attached at their ends to the head 50 and joined together at their opposite ends by a generally arcuate bight portion 61. The body 56 is preferably of a generally circular shape in transverse cross-section and with the legs 58 and 60 tapering toward one another in a direction away from the head 50 so as to facilitate insertion of the body 56 through the opening 10 in the support member P, as seen in FIG. 6.

In accordance with the invention, the resilient legs 58 and 60 are provided with projections 62 and 64 in the form of cam-like ribs which extend inwardly toward one another and in a direction toward the longitudinal central axis of the body 56. Preferably, the projections 62 and 64 are co-extensive in length with the transverse width of the legs 58 and 60 and are of a polygonal, such as triangular, shape in vertical transverse cross-section so as to provide smooth, arcuate cam-like surfaces on either side of an apex of the projections. By this arrangement, the projections 62 and 64 define a generally hour-glass shaped slot 67 which extends lengthwise between the legs 58 and 60 and which communicates with the opening 52 in the head 50. Preferably, the slot 67 has an upper portion 66 and a lower portion 68 disposed between the projections 62 and 64 and with the slot tapering inwardly and downwardly in a direction from the upper portion 66 toward the lower portion 68 so that the upper portion 66 has a slightly greater transverse dimension D than that, as at F, of the lower portion 68, but with both portions decreasing in transverse dimension in a direction toward the bight portion 61. Preferably, the maximum transverse width D of the opening 52 and the upper slot 66 are slightly less than the transverse dimension A (diameter) of the bulbous portion 24 of the expander member 4. The transverse length of the opening 52 and the slot portions 66 and 68 is preferably greater than the transverse dimension A (diameter) of the bulbous portion 24.

As best seen in FIGS. 2, 3 and 5, the transverse dimensions B and B′ of the shank portion 22 of the expander member 4 is approximately the same or slightly greater than the corresponding transverse dimensions of the opening 52 in the head 50 of the female member 6 so that in the initial or pre-latched portion (FIG. 7) the abutment portions 36 and 38 on the shank portion 22 are adapted for coacting engagement with the confronting arcuate portions 54 of the opening 52. The transverse distance E between the projections 62 and 64 on the female member 6 is less than the transverse dimension A (diameter) of the bulbous portion 24, and less than the transverse width B of the shank portion 22 of the expander member 4. By this arrangement, as the bulbous portion 24 of the expander member 4 is inserted through the opening 52 in the head 50, the resilient legs 58 and 60 defining the upper slot portion 66 are caused to be laterally deformed outwardly upon engagement of the bulbous portion 24 with the projections 62 and 64 and, thereafter, contract inwardly upon insertion of the bulbous portion 24 passed the projections into the lower slot portion 68, as will hereinafter be more fully described.

Figure 8:
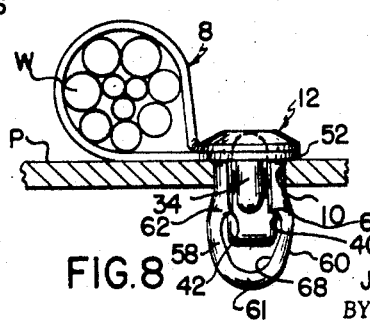
FIG. 8 is a fragmentary view, partly in section showing the final latched position of the drive pin member with respect to the loop-like body member for mounting the article on a support member.

As seen in FIG. 2, the body 56 of the female member 6 has a maximum transverse dimension C (diameter) which is preferably slightly less than the transverse dimension (diameter) of the opening 10 in the support member P which dimension decreases in a direction toward the bight portion 61 thereof. The axial length of the expander member 4 including the shank 22 and the bulbous 24 portions is preferably less than the axial length or depth of the slot 67 including portions 66 and 68 so that in the final latched position the bulbous portion 24 is spaced axially from the bight portion 61, as seen in FIG. 8.

As seen, the wall thickness of the resilient legs 58 and 60 adjacent the projections 62 and 64 is greater than that both above and below the projections. By this arrangement, generally all of the expanding and contracting movement of the legs 58 and 60 takes place on either side of the projections 62 and 64 and with the latter acting as fulcrum areas about which pivotal movement of the legs takes place.

The side surfaces 28 and 30 on the shank portion 22 of the expander member 4 may be of a flat construction or may be of a curved, such as concave, construction so as to facilitate camming coacting engagement with the projections 62 and 64 on the female member 6. The rounded axial end edges 32 and 34 on the shank portion 22 may correspond in contour to the arcuate end portions 54 of the opening 52 in the head 50 of the female member 6 to provide a smooth, sliding coaction therewith to maintain axial alignment of the expander member 4 during insertion into the loop-like body 56 and to prevent the body 20 of the expander member 4 from exiting through the open sides of the body 56.

Though the shank portion 22 of the expander member 4 has been illustrated as being of a polygonal shape, it is to be understood that it may be of other shapes, such as circular or the like, as desired.

Figure 7:
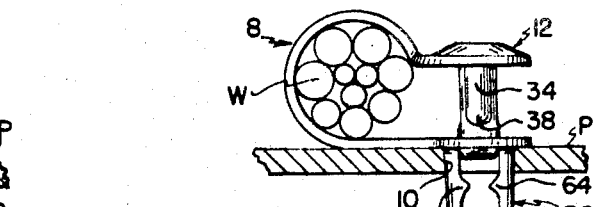
FIG. 7 is a fragmentary view, partly in section showing the initial pre-latched position of the drive pin member with respect to the loop-like body member.

In a typical application of the device, reference may be made to FIGS. 6 to 8 of the drawings wherein the device 2 is illustrated in use for mounting a plurality of elements W, such as a bundle of electrical wires or the like, on an apertured support member P, such as a panel or the like. As shown, the loop-like body 56 of the female member 6 may be inserted through the support opening 10 from the front side thereof. The strap 8 may then be wrapped around the elements W and the expander member 4 initially inserted into the female member 6. This initial insertion may be achieved by simply applying pressure, such as by a finger or the like. Upon initial insertion, the bulbous portion 24 of the expander member 4 is forced through the opening 52 which initially expands the upper portions of the legs 58 and 60 away from one another until the bulbous portion 24 is seated against the cam-like projections 62 and 64, and the abutment portions 36 and 38 of the axial end edges 32 and 34 seat against the confronting arcuate end edges 54 of the opening 52, wherefore, the expander member 4 is held in an axially aligned pre-latched position within the loop-like body 56 of the female member 6. Further pressure may then be applied to the head 12 of the expander member 4 so as to drive the bulbous portion 24 in a camming coacting engagement past the projections 62 and 64 which again expands the legs 58 and 60 outwardly away from one another until the bulbous portion 24 snaps downwardly beyond the projections and the head 12 of the expander member 4 is seated upon the confronting upper surface of the head 50 of the female member 6. As the bulbous portion 24 passes beyond the projections 62 and 64, the resilient legs 58 and 60 spring back to a slight extent, but remain in a substantially outwardly oblate deformed condition (FIG. 8) so as to provide a tight gripping engagement with the confronting undersurface of the panel P adjacent the opening 10 in the final latched or locked position of the device. In this position, the projections 62 and 64 are disposed in coacting gripping engagement with the shoulder portions 40 and 42 at the juncture between the shank portion 22 and the bulbous portion 24 so as to prevent axial withdrawal of the expander member 4 from its final locked position within the loop-like body 56 of the female member 6.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. A unitary, one-piece fastening device made from polymeric material for use in mounting articles comprising:

A flexible strap member, a deformable loop-like body member attached adjacent one end of said strap member and extending outwardly from one side thereof, a drive pin member attached adjacent the other end of said strap member and extending outwardly from the opposite side thereof and adapted for insertion into said loop-like body member, said loop-like body member including a mounting head having an opening therein, a pair of oppositely disposed laterally spaced legs extending outwardly from said head and defining a slot communicating with the opening in said head, a bight portion connecting said legs together adjacent the end of said legs remote from said head, each of said legs including a cam-like projection, said cam-like projections being oppositely disposed and extending in a direction toward one another inwardly into said slot, said drive pin member including a head and a shank portion depending downwardly from said drive pin head adapted to be disposed in snap-action relation in the slot between said leg members, an enlarged bulbous portion made integral with and depending downwardly from the end of said shank portion remote from said drive pin head, said bulbous portion having a maximum transverse dimension greater than the minimum transverse dimension between said cam-like projections for camming coacting engagement with said cam-like projections for deforming said legs outwardly upon insertion of said drive pin member into said loop-like body, the maximum transverse dimension of said bulbous portion being greater than the maximum transverse width and less than the maximum transverse length of said shank portion to form generally arcuate shoulders along the lengthwise dimension of said shank portion and rounded abutments adjacent the opposed sides of said shank portion intermediate said shoulders, said shoulders and abutments disposed at the juncture of said shank portion and said bulbous portion for guiding said shank portion into said slot, and said shoulders being disposed in underlying, interlocking engagement with said projections when said drive pin member is in the final installed position.

2. A fastening device in accordance with claim 1, wherein:

said drive pin head is generally circular in shape including a generally flat under surface disposed to lie in the general plane of said strap member, and including a generally conical upper surface which projects beyond the plane of said strap member.

3. A fastening device in accordance with claim 1, wherein:

said loop-like body is generally U-shaped in configuration, said opening in the head of said loop-like body member being generally polygonal in configuration, and said bulbous portion being generally circular in transverse cross section having a minimum dimension greater than at least one transverse dimension of said opening.

4. A fastening device in accordance with claim 1, wherein:

said drive pin head includes a generally circular centrally disposed opening, and said shank portion being of a generally polygonal construction being made integral with said drive pin head and disposed in transverse bridging relation in said opening to define generally arcuate slots on either side thereof.

5. A fastening device in accordance with claim 1, wherein:

said bulbous portion is generally circular in transverse cross section, and said shank portion being generally rectangular in transverse cross section including oppositely disposed flat side surfaces and a pair of oppositely disposed generally rounded end edges terminating in said abutments.

6. A fastening device in accordance with claim 5 wherein:

the minimum transverse dimension of said bulbous portion is greater than the maximum transverse dimension between said side surfaces defining a pair of oppositely disposed arcuate shoulders at the juncture of said shank portion and said bulbous portion.

7. A fastening device in accordance with claim 1, wherein:

said cam-like projections are generally co-extensive in length with the width of said leg members, and are generally triangular in shape, in vertical transverse cross section, defining a generally hourglass shaped slot betwen said legs, and the transverse dimension of said slot decreases in a direction from said head toward said bight portion.

8. A fastening device in accordance with claim 5, wherein:

said opening in the head of said loop-like body member is generally rectangular in configuration having oppositely disposed arcuate portions adjacent the opposed ends thereof, and said rounded end edges corresponding in contour to said arcuate end portions for smooth, sliding coaction therewith to maintain axial alignment of said drive pin member during insertion into said loop-like body member.

9. A fastening device in accordance with claim 1, wherein:
the thickness of said legs adjacent said projections is greater than that on either side of said projections providing fulcrum areas for pivotal movement of said legs thereabout.

10. A fastening device in accordance with claim 1, wherein:
said legs taper in thickness in a direction away from said mounting head toward said bight portion with said thickness decreasing in a direction toward said bight portion.

References Cited

UNITED STATES PATENTS

| | | | |
|---|---|---|---|
| 2,937,834 | 5/1960 | Orenick | 248—71 |
| 3,118,644 | 1/1964 | Wernig | 248—74 X |
| 3,144,695 | 8/1964 | Budwig | 248—74 X |
| 3,341,903 | 9/1967 | Buntic | 24—73.7 X |

CHANCELLOR E. HARRIS, Primary Examiner

U.S. Cl. X.R.

24—73